May 5, 1959  S. SMOLEN  2,885,165
ENGINE SUPPORT

Filed Nov. 12, 1954  3 Sheets-Sheet 1

INVENTOR
STANLEY SMOLEN

BY
*Bacon & Thomas*
ATTORNEYS

May 5, 1959

S. SMOLEN 2,885,165

ENGINE SUPPORT

Filed Nov. 12, 1954

INVENTOR
STANLEY SMOLEN

BY
Bacon & Thomas
ATTORNEYS

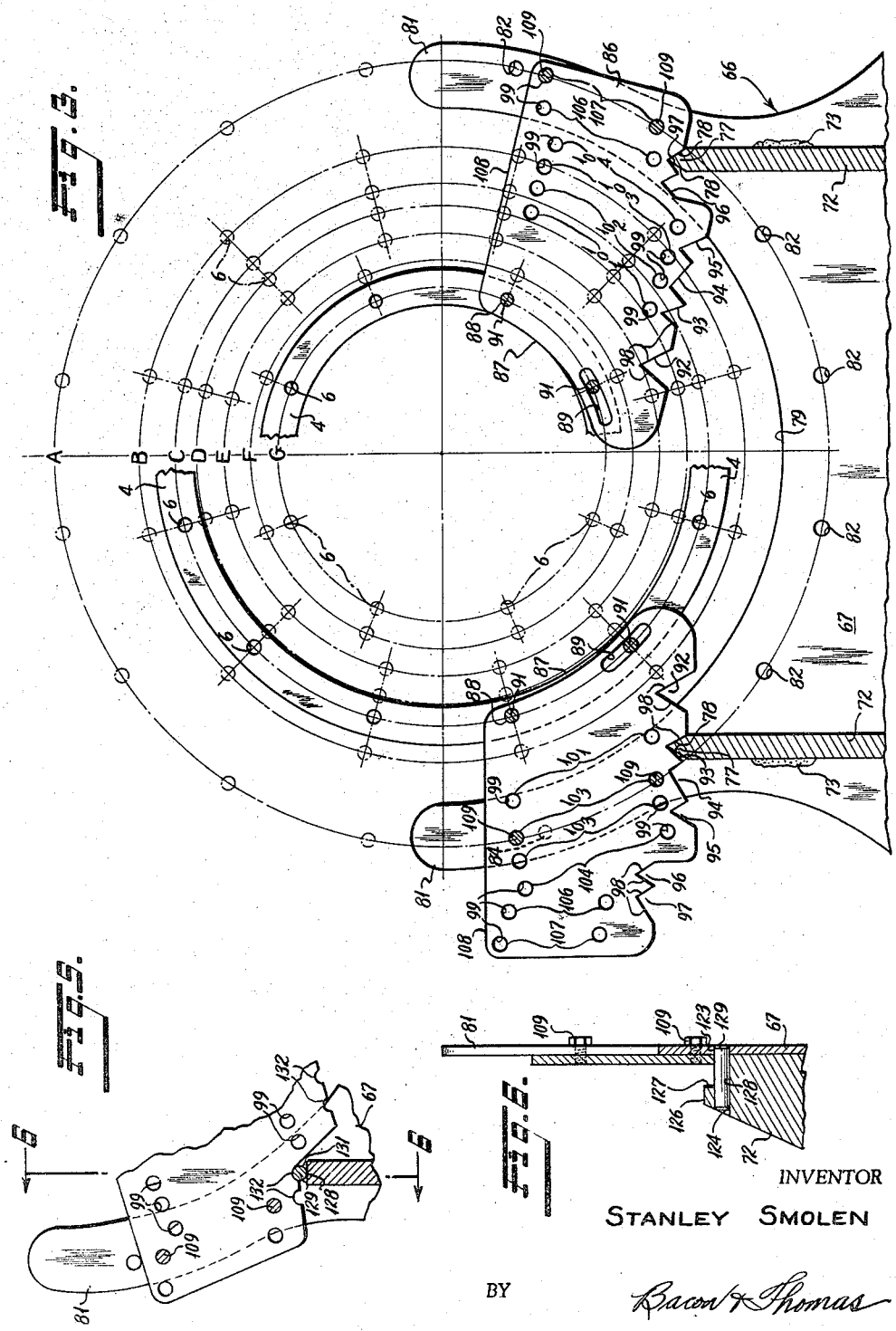

United States Patent Office 2,885,165
Patented May 5, 1959

2,885,165

ENGINE SUPPORT

Stanley Smolen, West Covina, Calif., assignor to Clayton Manufacturing Company, El Monte, Calif., a corporation of California Application November 12, 1954, Serial No. 468,199

9 Claims. (Cl. 248—13)

The present invention relates to novel means for adapting and supporting an infinite member of types and makes of engines for test and other purposes.

More particularly, the invention relates to a universal engine supporting stand, a support member, and a set or pair of universal adapter plates cooperating with the flywheel housing engine support flange or rear engine support plate to support various engines upon said stand for testing by a suitable power absorption device, for example, a hydraulic dynamometer; or for driving of the engine, for example, by a motoring dynamometer or other device.

In the past, the testing of engines by dynamometers has been confined, more or less, to laboratories; and, as a rule, special fixtures and adapters were provided for supporting each different type of engine upon a stand for test purposes. These fixtures or supports were usually of special design and although considerable time was required to fabricate and attach the same to mount the engine for testing, the amount of money and time so spent was comparatively small with respect to the expense and period of duration of the test. However, in recent times, there has been a demand both upon the part of engine manufacturers, and engine servicing and repair establishments for means capable of supporting an infinite number of types and models of engines with a minimum amount of expenditure of money for equipment and of time for setting up or mounting the engine to be tested. The problem of cheaply and quickly mounting an engine for test purposes is not so serious with an engine manufacturer who makes only a few different types of models of engines but is far more serious with engine servicing establishments which are required to handle all sizes and types of internal combustion engines.

Engine manufacturers are primarily interested in determining the operating characteristics of new engines, although considerable interest is being manifested in employing dynamometers for running-in or breaking-in new engines so that the purchaser of a new motor vehicle is relieved of the usual slow driving period to "break-in" the engine. On the other hand, engine repairing and rebuilding establishments employ dynamometers for either testing the engine to determine its operating characteristics, or for breaking-in or running-in partially or completely rebuilt engines, so that when such engine is installed in a motor vehicle, it can be immediately run at any operating speed desired without the danger of injury to working parts. Therefore, in either case, it is of the utmost importance that the time required for setting up the engines for test purposes shall be maintained at a minimum in order to keep costs as low as possible. The present invention not only provides means for quickly setting up an engine for testing but assures that the engine shaft must assume an exact position relative to the support, otherwise the notches in the mounting plates will not properly seat on their abutments.

Although it has been appreciated that the flywheel housing, engine support flange, or rear engine support plate, afford a convenient point of attachment for supporting engines, the problem of quickly and cheaply supporting various types and makes of engines for dynamometer test purposes has been greatly complicated by the lack of standardization on the part of engine manufacturers with respect to the design and construction of flywheel housing, etc. and also with respect to the arrangement and location of the holes for the reception of the cap screws or bolts which normally secure the transmission casing to such housing, etc. This lack of standardization has necessitated the use of special supports or adapters for each type of engine to be tested, as before stated, thus entailing considerable expense for the adapter parts and also requiring the expenditure of considerable time in adjustment and changing from one set of special adapters to another when different engines are tested in succession.

When the designation "flywheel housing" is used hereinafter it is to be understood to include engine support flanges or rear engine support plates which are sometimes used in lieu of a flywheel housing.

As will be understood from the foregoing, the principal object of this invention is to satisfactorily solve the problems heretofore existing in supporting a large number of types and makes of engines for test purposes.

Another important object of the invention is to provide means for supporting one end of a large number of types and makes of engines by attachment to the flywheel housing, which may vary as to size and the number and spacing of the threaded apertures therein for the reception of clutch and transmission housing attaching screws.

A still further object of the invention is to provide engine supporting means achieving the preceding object, which will further insure the positioning of the axis of the flywheel at substantially the same point for all makes and sizes of engines, which may be supported.

A further object of the invention is to provide a universally adjustable engine stand and a pair of adapter plates for use with said stand including a relatively few parts capable of mounting a large number of different types of engines upon said stand for readily transmitting the driving torque of an engine so mounted to a power absorption device.

A still further object of the invention is to provide engine supporting means which is of relatively simple construction and relatively inexpensive to make, but which, nevertheless, embodies principles adaptable to mounting and supporting many types of engines.

Other objects and advantages of the invention will be apparent from the following description taken in conjunction with the accompanying drawings, in which:

Fig. 3 is a fragmentary composite view on an enlarged scale, one-half showing an adapter plate supporting one side of a large flywheel housing and the other side showing the relationship of the parts when a small flywheel housing is being supported;

Fig. 4 is an enlarged fragmentary sectional view taken on the line 4—4 of Fig. 1, looking in the direction of the arrows, showing clamping means for maintaining the support structure for the front and rear ends of an engine in adjusted position.

Fig. 5 is a fragmentary enlarged view, partly in section, showing a modified construction for resting an adapter plate on the support means for the flywheel housing end of an engine; and Fig. 6 is a sectional view taken on the line 6—6 of Fig. 5 looking in the direction of the arrows.

Figure 1:
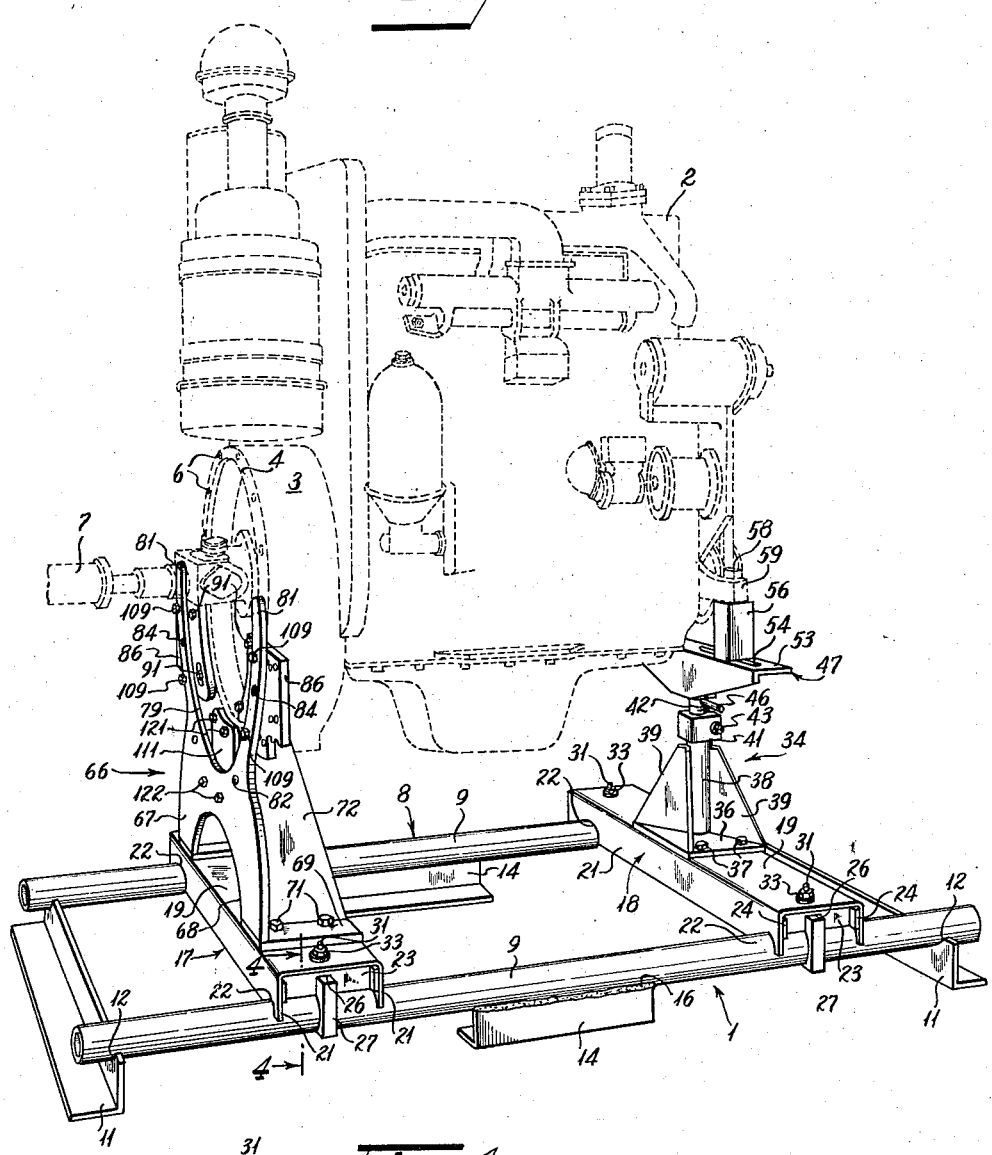
Fig. 1 is a perspective view illustrating the present engine support with an engine, shown in dotted lines, mounted thereon.
Figure 2:
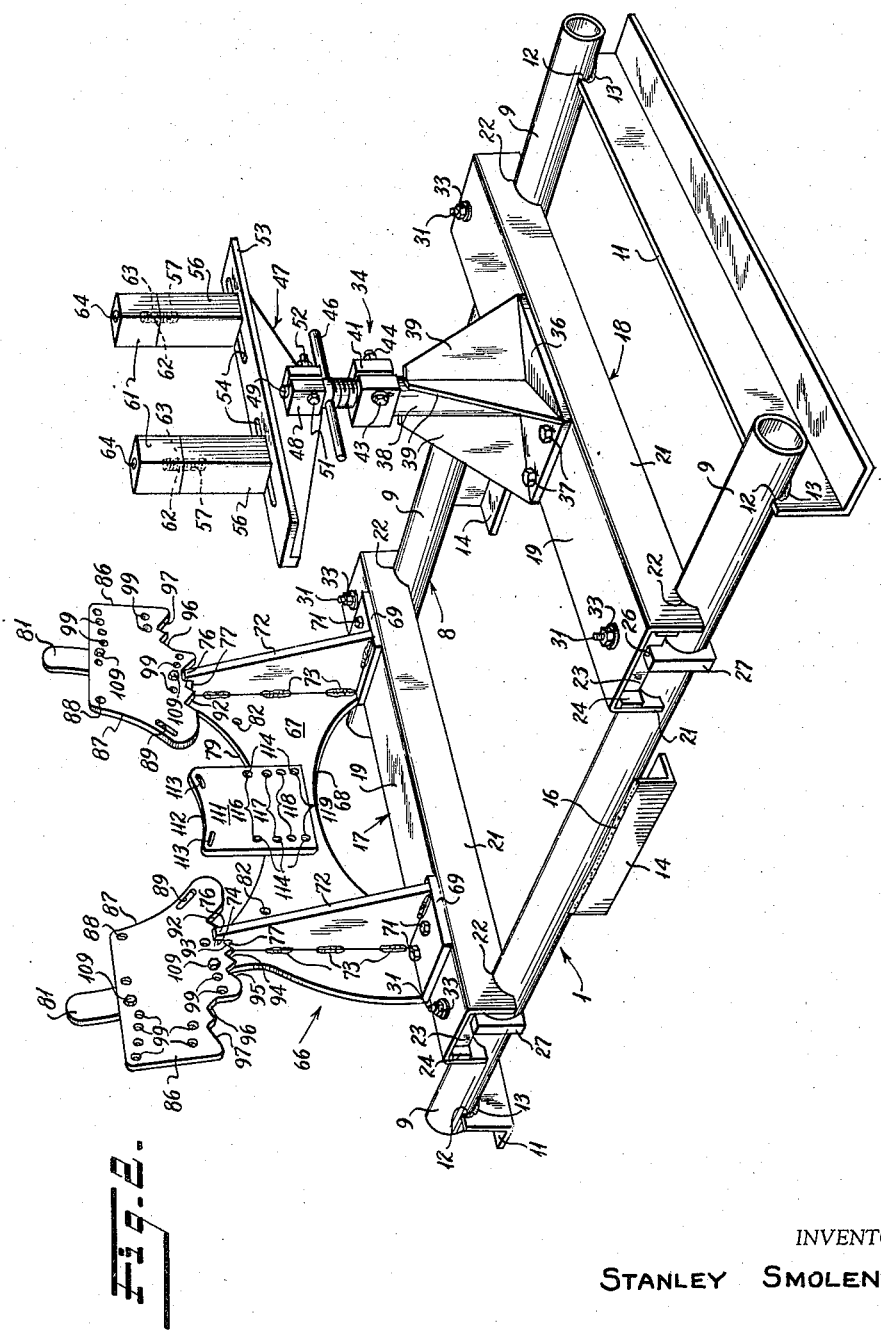
Fig. 2 is a perspective view showing the engine support, itself, without a supported engine.

Referring now to the drawings, the numeral 1 generally designates the engine support of the present invention. An engine 2 of conventional design, having the flywheel housing 3, is shown in dotted lines mounted on the support 1. As is customary, the flywheel housing 3 is provided with a flange portion 4 having bolt holes 6 for the attachment of the clutch and transmission housings (not shown).

The numeral 7 represents a force transmitting shaft, shown in dotted lines, universally connected to the flywheel of the engine 2 with the axis of the shaft coinciding with the axis of the flywheel. The other end of shaft 7 will be universally connected to a dynamometer or power absorption device (not shown), and it is apparent that for best results, the axis of the flywheel should be located at substantially the same point with respect to the support for all engines being tested and the manner in which this is accomplished by the present invention will be brought out hereinafter.

Before describing in detail the construction of the engine support 1, attention is directed to Fig. 3 of the drawings in which there is shown, diagrammatically designated as A, B, C, D, E, F, and G, the relative size of the bolt hole circles of the flywheel housings of a large number of makes and types of engines, which may be supported, and the number and angular spacing of the bolt holes 6 provides around the circle. Engine constructions have been standardized to the extent that the vast majority of those which can be supported by a device such as the present will have a flywheel housing provided with one of the bolt hole patterns illustrated. The diameters of the bolt hole circles of these engines will range between approximately 11 and 27 inches.

The support 1 includes a base portion 8 comprising a pair of spaced parallel rail members 9, which may conveniently be formed of tubular metal pipe. The rail members 9 may be mounted upon a pair of spaced angle irons 11 the upper edges of which are provided with recesses 12 to receive tubular rail members 9, which may be secured in place by any suitable means, such as welding as shown at 13. To support rails 9 intermediate angle irons 11, a pair of short angle irons 14 are secured as by welding 16 to rail members 9 with the base portions of angle irons 14 lying in the same plane as the base portions of the angle irons 11.

Slidably and adjustably mounted on rail members 9 are a pair of transverse members 17 and 18 of similar construction adapted to carry the support means for the flywheel end and the front end, respectively, of an engine. Transverse members 17 and 18 may comprise an inverted U-shaped member having a base portion 19 and leg portions 21. The lower edges of leg portions 21 are recessed as shown at 22 to conform to the upper surfaces of rail members 9 and provide for ready sliding movement. U-shaped transverse members 17 and 18 are reenforced adjacent each end with web members 23 which may be provided with flanged end portions 24 for ready attachment to the inner faces of leg portions 24 as by welding or the like.

Each of the web members 23 is provided with a slot 26 to receive a clamping block 27 designed to maintain transverse members 17 and 18 in adjusted position. Each clamping block 27, as best shown in Fig. 4, is provided with an opening 28 conforming to, but slightly larger than tubular rail members 9 and provided with inwardly directed portions 29, each underlying a portion of the lower surface of the rail members. Posts 31 are threaded in the upper edge of clamping blocks 27 and project through apertures 32 in the base portion 19 of transverse members 17 and 18. Nuts 33 are provided on the ends of threaded posts 31 and it will be obvious that by loosening or tightening these nuts, the transverse members 17 and 18 are conditioned for sliding adjustment or are firmly secured in adjusted position.

Support means generally designated by the numeral 34 for the end of an engine remote from the flywheel housing is mounted on transverse member 18 and may include a standard comprising a flat base member 36 secured to the base portion 19 of transverse member 18 by bolts 37 or the like. A tubular column 38 is secured in upright position upon base member 36 by welding or other suitable means. Tubular column 38 is reenforced by a plurality of triangular rib members 39 which may be welded along one edge to the tubular column 38 and along another edge to the upper surface of base member 36.

Secured on the upper end of column 38, as by welding, is a split nut 41, which threadedly receives a screw member 42, the lower portion of which is freely accommodated by tubular column 38. A bolt 43 is provided across the split portion of nut 41 and a nut 44 is threaded on bolt 43, which, when tightened, maintains screw member 42 firmly and rigidly in adjusted position. A transverse handle 46 is inserted in screw member 42 to provide easy turning for purposes of adjustment.

A supporting platform 47 is mounted on the upper end of screw member 42 by means of a split sleeve 48, which surrounds a reduced portion 49 of screw member 42. Split sleeve 48 may be tightened or loosened on the upper end of the screw member by means of a bolt 51 passing through the split portion of the sleeve and a nut 52.

Supporting platform 47 includes a ledge portion 53 overhanging split sleeve 48 and the upper end of screw member 42, and is provided with a pair of longitudinally extending slots 54. A pair of blocks 56 are mounted for longitudinal sliding movement along ledge 53 and may be guided in this movement by screws (not shown) which may be threaded upwardly into blocks 56 through slots 54 from a point beneath ledge portion 53 and tightened or loosened as desired. The upper ends of blocks 56 are provided with threaded apertures 57 to receive screws 58 passing through the usual mounting pads 59 of an engine after the blocks 56 have been laterally adjusted to a registering position.

A pair of auxiliary blocks 61 may be provided for use with smaller engines so that the vertical adjustment, which may be obtained by threading screw member 42 in and out, may be maintained at a minimum. Each of the blocks 61 may be secured to a block 56 by a connecting post 62 threaded at both ends for reception by the threaded aperture 57 in the upper end of block 56 and by a threaded aperture 63 in block 61. Each block 61 will also have a threaded aperture 64 for the reception of screw 58.

The support means for the flywheel end of an engine generally designated by the number 66, comprises the most important part of the present invention and is mounted on the transverse member 17. Support means 66 includes a support plate 67, which may be arched as shown at 68 to conserve metal, secured in upright fashion as by welding or the like to a pair of pad members 69, which are in turn reversibly mounted on the upper surface of the base portion 19 of transverse member 17 by bolts 71 or other suitable means. Support plate 67 is reenforced by generally triangular ribs 72, each secured along one edge as by welding 73 to the support plate 67 and similarly secured along its lower edge to the upper surface of the corresponding one of the pads 69.

The upper end of each rib 72 is relieved at 74 to provide raised portions 76 and a pair of laterally spaced abutments 77, the purpose of which will be set forth hereinafter. As best shown in Fig. 3, abutments 77 are provided with upwardly converging flat surfaces 78.

The upper edge 79 of support plate 67 is arcuately shaped and the plate 67 is formed so as to be provided with a pair of upstanding arms 81. The arc formed by the upper edge of support plate 67 preferably has a radius such that it will fall just within the bolt hole circle A of the flywheel housing of the largest engine which the present support is designed to accommodate. A series of equally spaced apertures 82 is provided along the arcuate edge 79 and located so as to register with the bolt holes 6 of the largest flywheel housing. It will be seen that this series of apertures terminates at each end with a pair of apertures located in each of the arms 81 above abutments 77. Apertures 84 are provided in the arms 81 intermediate the last two apertures at each end of the series of apertures formed by the apertures 82, for a reason which will appear hereinafter.

The space between the flywheel housing and the support plate for all of the flywheel housings which can be accommodated, except the largest, is bridged by a pair of universal adapter plates 86, one to be attached to each side of the flywheel housing. Each adapter plate 86 is preferably provided with an arcuate inner edge 87 and adjacent the upper end of this arcuate edge, there is provided an aperture 88 adapted to be placed in registry with the first bolt hole of each flywheel housing located below the horizontal center line. Spaced below aperture 88 is an elongated slot 89 positioned so as to register with the next adjacent bolt hole of any flywheel housing having a bolt hole circle B, C, D, E, F, or G below that with which the aperture 88 is in registry. The elongated slot 89 is preferably of arcuate configuration and the radius of the arc formed thereby may conveniently be that of the bolt hole circle of one of the flywheel housings of intermediate size, such as the bolt hole circle C when the aperture 88 is placed on that circle. This will provide for a minimum variation of the tilt of the adapter plates when attached to the flywheel housings of varying sizes.

Cap screws 91 are provided for cooperation with bolt holes 6 to secure plates 86 to the flywheel housing of the engine to be supported.

The lower edge of each adapter plate 86 is provided with a series of notches 92, 93, 94, 95, 96, and 97. It will be seen that the notches 92 will rest on abutments 77 when the adapter plates are secured to the flywheel housing having the bolt hole circle B, that the notches 93 will rest on abutments 77 when the adapter plates are secured to a flywheel housing having the bolt circle C and continuing until the notches 97 rest on the abutments 77 when the plates 86 are secured to the smallest flywheel housing having the bolt hole circle G. It will also be noted that each of the notches 92, 93, 94, 95, 96, and 97 are positioned so that when the adapter plates are secured to any given flywheel housing, each engine is supported with the flywheel axis always at substantially the same point with respect to the support. The sudden change in elevation between notches 95 and 96 is caused by the sudden variation in the inclination of adapter plates 86 on passing from a flywheel housing having the bolt hole circle E to one having the bolt hole circle F, which will be seen to have one less bolt hole, resulting in a variation in the angular spacing between each bolt hole.

Each of the notches is provided with downwardly diverging flat side walls 98 and each has a configuration such that at least one of the side walls 98 will be contiguous with one of the upwardly converging flat surfaces 78 of the abutments 77 to furnish an extensive bearing surface.

So that the adapter plates 86 may be rigidly secured to the support plate 67, there are provided in each plate 86 a plurality of threaded apertures 99 forming a plurality of pairs of apertures 101, 102, 103, and 104, with the threaded apertures 99 of each pair spaced apart the same distance as apertures 82 in arms 81 and positioned so that the pair of threaded apertures 101 of each plate 86 will be in registry with the pair of apertures 82 in the corresponding arm 81 when the adapter plates are secured to a flywheel housing having the bolt hole circle B and the notches 92 rest on abutments 77 and progressing until the pair of threaded apertures 104 will be in registry with the apertures 82 in arms 81 when the adapter plates are secured to a flywheel housing having the bolt hole circle E and the notches 95 rest on the abutments 77.

Threaded apertures 99 also provide a pair of threaded apertures 106 and a pair of threaded apertures 107 in each adapter plate 86 and the apertures of each pair are spaced apart a distance equal to that between apertures 84 and the next lower of the apertures 82 in arms 81. The pairs of threaded apertures 106 and 107 are positioned so that the pair 106 will be in registry with apertures 84 and the next lower of the apertures 82 in the arms 81 when the adapter plates are secured to a flywheel housing having the bolt hole circle F and the pair of threaded apertures 107 will be in registry with these apertures when the adapter plates are secured to a flywheel housing having the bolt hole circle G. It has been found convenient to provide the more closely spaced pairs of threaded apertures 106 and 107 to keep the size of the adapter plates 86 at a minimum since, otherwise, their upper edges 108 would have to be raised in their entirety or at least a raised portion would have to be provided adjacent to their outer end so that the apertures of the pairs of threaded apertures 106 and 107 could be spaced apart a distance equal to that of the apertures of the pairs of threaded apertures 101, 102, 103 and 104.

Cap screws 109 pass through the apertures in arms 81 and are threaded into the aligned threaded openings 99 in adapter plates 86 to secure the adapter plates firmly in position.

To furnish additional support for heavier engines, such as those having flywheel housings provided with bolt hole circles B, C, D, and E, there may be provided a plate 111 having an arcuate upper edge 112. A pair of spaced elongated slots 113 are provided adjacent arcuate edge 112 and these slots are dimensioned and positioned so that they will register with the two lowermost of the bolt holes 6 of the flywheel housings having bolt hole circles represented by B, C, D and E of Fig. 3.

Plate 111 is also provided with threaded apertures 114 which form a series of pairs 116, 117, 118 and 119 of threaded apertures with the apertures of each pair spaced apart the same distance as the spacing between apertures 82 of support plate 67. The pairs of threaded apertures 116, 117, 118 and 119 are positioned so that when elongated slots 113 are in registry with the two lowermost bolt holes 6 of a flywheel housing having the bolt hole pattern B, the pair 116 will be in registry with the two middle members of the series of apertures 82 in support plate 67 and so on until the pair of threaded apertures 119 will be in registry with these middle apertures 82 when the slots 113 are in registry with the two lowermost bolt holes 6 of a flywheel having the bolt hole pattern E.

Cap screws 121 pass through elongated slots 113 and are threaded into the two lowermost bolt holes 6 to secure plate 111 to the flywheel housing. Cap screws 122 pass through the two middle apertures 82 in the series of apertures in the support plate 67 and are threaded into the registering pair of threaded apertures 114 in the plate 112 to secure the plate 111 to support plate 67.

In Figs. 5 and 6, there is shown a modified form of abutment carried by the support plate 67 and a correspondingly modified notch configuration to receive the same. Round aligned openings 123 and 124 are drilled through the support plate 67 and raised portions 126 of the ribs 72, which remain after a portion has been removed to form recesses 127. The lowermost portions of the walls of openings 123 and 124 will coincide with the ledge portion 128 of each recess 127 and a round pin 129 is passed through openings 123 and 124 and secured in place as by welding 131 to the upper surface of ledge 128.

This provides an abutment having a rounded upper surface and notches 132 positioned in a manner corresponding to the notches 92, 93, 94, 95, 96, and 97 are provided with rounded walls to conform closely to the rounded upper surfaces of the pins 129. Otherwise, the constructions shown in the two forms of the invention are identical.

With the above detailed description in mind, the manner of mounting a large variety of engines on the present support will be obvious. If one is mounting the largest of the engines adapted to be accommodated and having a flywheel housing with the bolt hole circle represented at A in Fig. 3, the support means 66 will be mounted on transverse member 17 with the ribs 72 facing forwardly. Then by loosening nuts 33 transverse members 17 and 18 can be adjusted to the correct distance apart and nuts 33 tightened to maintain this adjustment. The front end support will then be adjusted vertically to the proper height by turning screw member 42 and the blocks 56 will be laterally adjusted to the proper spacing.

The large engine will then be lifted by suitable means and positioned with respect to the support so that the bolt holes 6 of the flywheel housing are in alignment with the series of apertures 82 in support plate 67 and with the mounting pads at the end of the engine remote from the flywheel resting on the blocks 56 with the apertures in the pad aligned with the threaded aperture 57 in block 56. Cap screws, not shown in the drawings, will then be passed through each of the apertures 82 and threaded into the aligned bolt holes 6 of the flywheel housing and screws 58 are passed through the apertures in the mounting pads 59 and threaded into apertures 57 in the blocks 56. The largest engine adapted to be accommodated will then be firmly mounted on its support.

In order to mount one of the smaller engines having flywheel housings with bolt hole patterns B, C, D, E, F, or G, the support means 66 must be reversed on transverse member 17 so that ribs 72 face rearwardly. The transverse members 17 and 18 and front end support 34 will be adjusted in the manner described above.

Adapter plates 86 then will be secured to both sides of the flywheel housing in the manner pointed out earlier and the engine lifted and deposited on the stand with the proper notch of each adapter plate resting on the spaced abutments 77 carried by support plate 67 and with the usual mounting pads of the engine at the end remote from the flywheel resting on the blocks 56 with the opening in the pad in registry with the threaded aperture 57 in the upper end of the blocks. Cap screws 109 will then be screwed home in the threaded apertures of adapter plates 86 in alignment with spaced apertures in the arms 81, thus securing the flywheel end of the engine firmly in place and the screws 58 threaded into the apertures 57 in the blocks 56 so that the engine as a whole will be secured firmly and rigidly to the support.

It will be apparent from the foregoing that the present invention provides an engine support which is relatively simple in construction and which requires a minimum of adjustment for setting up an engine for driving by a motoring dynamometer etc. or for testing by an absorption dynamometer, or for any other purpose.

It will be understood that various changes may be made in the details of construction and in the arrangement of the parts of the support illustrated and described herein, without departing from the spirit of the invention or the scope of the annexed claims.

I claim:
1. Means for supporting the flywheel end of an engine having a flywheel housing provided with a circle of evenly spaced bolt holes concentric with the flywheel axis, comprising: a pair of laterally spaced abutments; a pair of plates, each of said plates having a pair of apertures therein adapted to register with a pair of said bolt holes in said flywheel housing, each of said plates also having a notch in the lower edge thereof for resting said plate on said abutments with each notch receiving one of said abutments; and fastening means adapted to cooperate with said bolt holes for securing one of said plates to each side of said flywheel housing.

2. Means for supporting the flywheel end of an engine having a flywheel housing provided with a circle of evenly spaced bolt holes concentric with the flywheel axis, comprising: a pair of spaced arms, each carrying an abutment and each also having a pair of spaced apertures therein; a pair of plates, each of said plates having a pair of apertures therein adapted to register with a pair of said bolt holes in said flywheel housing, each of said plates also having a notch in the lower edge thereof for resting said plates on said abutments with said notches receiving said abutments and each of said plates also having a pair of threaded apertures therein spaced apart the same distance as said apertures in said arms and located so as to register with said apertuers in said arms when said abutment is received by said notch; fastening means adapted to cooperate with said pairs of bolt holes in said flywheel housing for securing said plates to said flywheel housing; and threaded fastening means cooperating with said pairs of spaced threaded apertures in said plates securing said plates to said arms.

3. Means for supporting the flywheel end of a variety of engines having flywheel housings provided with bolt hole circles of different diameters concentric with the flywheel axis, the bolt holes of each circle being equally spaced, comprising: a pair of laterally spaced abutments; a pair of plates, each of said plates having an aperture adapted to register with a selected one of said bolt holes on each side of said bolt hole circle and an elongated slot spaced from said aperture in said plate, said slot being adapted to register with an adjacent bolt hole in any of said bolt hole circles, each of said plates also being provided with a series of notches in its lower edge arranged so that one of said notches receives one of said abutments to support any of said engines with the flywheel axis at substantially the same point; and fastening means adapted to cooperate with said adjacent bolt holes for securing said plates to said flywheel housing.

4. The engine support of claim 3 wherein said abutments comprise a pair of upwardly converging flat surfaces and each of said notches in the lower edges of said plates comprises a pair of downwardly diverging flat surfaces, the configuration being such that at least one of said flat surfaces of each of said notches will bear in contiguous relationship on at least one of said flat surfaces of said abutment.

5. The engine support of claim 3 wherein each of said abutments comprises a pin having a rounded upper surface and the walls of each of said notches in the lower edges of each of said plates is correspondingly shaped to provide an extensive bearing surface.

6. Means for supporting the flywheel end of a variety of engines having flywheel housings provided with bolt hole circles of different diameters concentric with the flywheel axis, the bolt holes of each circle being equally spaced, comprising: a pair of spaced arms, each carrying an abutment and each also having a pair of spaced apertures therein; a pair of plates, each of said plates having an aperture adapted to register with a selected one of said bolt holes on each side of a bolt hole circle and an elongated slot spaced from said aperture in said plate, said slot being adapted to register with an adjacent bolt hole in any of said bolt hole circles, each of said plates also being provided with a series of notches in its lower edge arranged so that one of said notches receives one of said abutments to support any of said engines with the flywheel axis at substantially the same point, each of said plates also having a plurality of pairs of threaded apertures spaced apart the same distance as said pair of apertures in each of said arms and located so that one of said pairs will register with said pair of said apertures in said arm regardless of which of said notches in said plate receives said abutment; fastening means adapted to cooperate with said adjacent bolt holes for securing said plates to said flywheel housing; and threaded fastening means cooperating with said spaced threaded apertures in said plates for securing said plates to said arms.

7. Means for supporting the flywheel end of a variety of engines having flywheel housings provided with bolt hole circles of different diameters concentric with the flywheel axis, the bolt holes of each circle being equally spaced, comprising: a base portion; an upright support plate reversibly mounted on said bare portion, said support plate having an arcuate upper edge terminating just within the bolt hole circle of the flywheel housing of the largest engine to be supported, said support plate being provided along said arcuate upper edge with a series of apertures located and spaced so as to register with the bolt holes of the bolt hole circle of the flywheel housing of the largest engine to be supported said support plate also having an abutment secured on each side thereof below the last pair of apertures of said series on each side; a pair of plates, each of said plates having an aperture adapted to register with a selected one of said bolt holes on each side of a bolt hole circle and an elongated slot spaced from said aperture in said plate, said slot being adapted to register with an adjacent bolt hole in any of said bolt hole circles, each of said plates also being provided with a series of notches in its lower edge arranged so that one of said notches receives one of said abutments to support any of said engines with the flywheel axis at substantially the same point, each of said plates also having a plurality of pairs of threaded apertures therein spaced apart the same distance as said apertures in said support plate and located so that one of said pairs of threaded apertures registers with one of said last pairs of said apertures of said series of apertures along the arcuate upper edge of said upright support plate regardless of which of said notches receive said abutments; fastening means adapted to cooperate with said bolt holes for securing said plates to said flywheel housing; and threaded fastening means coperating with said threaded apertures in said plates for securing said plates to said upright support plate, the arrangement being such that in one position of said upright support the flywheel housing of the largest engine to be supported may be directly secured to said upright support plate and in the reversed position of said support plate, the flywheel housings of smaller engines to be supported may be secured to said upright support through said plates.

8. Means for supporting a variety of engines having flywheel housings provided with bolt hole circles of different diameters concentric with the flywheel axis, the bolt holes of each circle being equally spaced, comprising: a base portion including a pair of spaced parallel rail members; a pair of transverse members slidably mounted on said rail members; support structure for the flywheel end of an engine secured to one of said transverse members, said support structure including a support plate having spaced arms, each carrying an abutment and each also having a pair of spaced apertures therein, said support structure also including a pair of plates, each of said plates having an aperture adapted to register with a selected one of said bolt holes on each side of a bolt hole circle and an elongated slot spaced from said aperture in said plate, said slot being adapted to register with an adjacent bolt hole in any of said bolt hole circles, each of said plates also being provided with a series of notches in its lower edge arranged so that one of said notches receives one of said abutments to support any of said engines with the flywheel axis at substantially the same point, each of said plates also having a plurality of pairs of threaded apertures spaced apart the same distance as said pair of apertures in each of said arms and located so that one of said pairs will register with said pair of said apertures in said arm regardless of which of said notches in said plate receives said abutment, said support structure also including fastening means adapted to cooperate with said adjacent bolt holes for securing said plates to said flywheel housing and threaded fastening means cooperating with said spaced threaded apertures in said plates for securing said plates to said arms; and a second support structure for the end of said engine remote from said flywheel end secured to the other of said transverse members.

9. Means for supporting the flywheel end of a variety of engines having flywheel housings provided with bolt hole circles of different diameters concentric with the flywheel axis on a stand having an abutment above which is a pair of spaced apertures, comprising a plate having an aperture adapted to register with a selected one of said bolt holes on one side of a bolt hole circle and an elongated slot spaced from said aperture in said plate, said slot being adapted to register with an adjacent bolt hole in any of said bolt hole circles, said plate also being provided with a series of notches in its lower edge arranged so that one of said notches receives said abutment to support any of said engines with the flywheel axis at substantially the same point when said engine is similarly supported at its other side and said plate also having a plurality of pairs of apertures spaced apart the same distance as said pair of apertures above said abutment and located so that one of said pairs of apertures in said plate will register with said pair of apertures above said abutment regardless of which of said notches in said plate receives said abutment.

References Cited in the file of this patent

UNITED STATES PATENTS

| | | |
|---|---|---|
| 1,727,869 | Dultmeier | Sept. 10, 1929 |
| 2,531,702 | Reek | Nov. 28, 1950 |
| 2,565,473 | Cline | Aug. 28, 1951 |
| 2,687,860 | McNitt | Aug. 31, 1954 |